(12) United States Patent
Dullaert et al.

(10) Patent No.: US 8,784,542 B2
(45) Date of Patent: Jul. 22, 2014

(54) NANOFIBRE MEMBRANE LAYER FOR WATER AND AIR FILTRATION

(75) Inventors: Konraad Albert Louise Hector Dullaert, Heverlee (BE); Marko Dorschu, Beek (NL); Arnaud David Henri Chiche, Aachen (DE)

(73) Assignee: DSM IP Assets B.V., Heerlen (NL)

( * ) Notice: Subject to any disclaimer, the term of this patent is extended or adjusted under 35 U.S.C. 154(b) by 132 days.

(21) Appl. No.: 13/376,616

(22) PCT Filed: Jul. 15, 2010

(86) PCT No.: PCT/EP2010/060235
§ 371 (c)(1),
(2), (4) Date: Feb. 17, 2012

(87) PCT Pub. No.: WO2011/015439
PCT Pub. Date: Feb. 10, 2011

(65) Prior Publication Data
US 2012/0137885 A1 Jun. 7, 2012

(30) Foreign Application Priority Data

Jul. 15, 2009 (EP) .................................... 09165497
Jun. 3, 2010 (EP) .................................... 10164875

(51) Int. Cl.
- *B01D 71/56* (2006.01)
- *B01D 53/22* (2006.01)
- *B01D 69/12* (2006.01)
- *B01D 69/02* (2006.01)
- *B01D 39/16* (2006.01)

(52) U.S. Cl.
USPC .............. 96/12; 96/4; 96/11; 55/487; 55/521; 55/528; 210/500.38; 210/493.1; 210/489; 427/244; 427/384; 977/788; 977/840

(58) Field of Classification Search
USPC .............. 96/4, 11, 12, 13; 95/45; 55/486, 487, 55/521, 527, 528; 210/500.38, 493.1, 489; 427/244, 384; 977/788, 840
See application file for complete search history.

(56) References Cited

U.S. PATENT DOCUMENTS

| | | | | |
|---|---|---|---|---|
| 6,743,273 | B2 * | 6/2004 | Chung et al. | 55/487 |
| 2007/0125700 | A1 * | 6/2007 | Ding et al. | 55/527 |
| 2007/0125703 | A1 | 6/2007 | Chapman et al. | |
| 2008/0307971 | A1 * | 12/2008 | Horie et al. | 95/287 |
| 2009/0255226 | A1 * | 10/2009 | Kohli et al. | 55/379 |
| 2013/0082424 | A1 * | 4/2013 | Imashiro et al. | 264/465 |
| 2013/0196405 | A1 * | 8/2013 | Singh et al. | 435/182 |

OTHER PUBLICATIONS

International Search Report for PCT/EP2010/060235, mailed Dec. 13, 2010.

* cited by examiner

*Primary Examiner* — Jason M Greene
(74) *Attorney, Agent, or Firm* — Nixon & Vanderhye P.C.

(57) ABSTRACT

The invention relates to a nanofiber membrane layer having a basis weight of 0.01-50 g/m2 and a porosity of 60-95%, comprising a nanoweb made of polymeric nanofibers with a number average diameter in the range of 50-600 nm, consisting of a polymer composition comprising a semicrystalline polyamide having a C/N ratio of at most 5.5. The invention also relates to water and air filtration devices comprising such a nanofiber membrane layer.

17 Claims, No Drawings

NANOFIBRE MEMBRANE LAYER FOR WATER AND AIR FILTRATION

This application is the U.S. national phase of International Application No. PCT/EP2010/060235, filed 15 Jul. 2010, which designated the U.S. and claims priority to EP Application No. 09165497.0, filed 15 Jul. 2009 and EP Application No. 10164875.6, filed 3 Jun. 2010, the entire contents of each of which are hereby incorporated by reference.

The invention relates to a nanofibre membrane layer, more particular a nanofibre membrane layer comprising a nanoweb made of polymeric nanofibres, which can be used for water filtration or air filtration. The invention is also related to filter devices for water filtration, respectively air filtration, comprising a membrane layer comprising a nanoweb made of polymeric nanofibres.

A membrane layer is herein understood to be a thin, pliable, sheet-like porous layer. A nanofibre membrane layer is herein understood a membrane layer of which the basic structure consists of nanofibres. A layer with a basic structure of fibres can be called a web layer. In analogy, a layer with the basic structure consisting of nanofibres is also called a nanoweb.

Membranes can have different shapes, e.g. tubes and layers. Membranes occur in nature, but artificial membranes are industrially more important. An important class of synthetic membranes is that of polymeric membranes. Examples thereof are membranes comprising a nanoweb made of polymeric nanofibres and so-called phase inversion membranes. Membranes occur or are used as interphase material. Because of their specific structure of high porosity and small pore size, membranes can selectively transfer certain chemical species over others.

An artificial membrane, or synthetic membrane, is a synthetically created membrane which is usually intended for separation purposes in laboratory or in industry. Synthetic membranes have been successfully used for small and large-scale industrial processes since the middle of twentieth century. A wide variety of synthetic membranes is known. They can be produced from organic materials such as polymers and liquids, as well as inorganic materials. The most of commercially utilized synthetic membranes in separation industry are made of polymeric structures. They can be classified based on their surface chemistry, bulk structure, morphology, and production method. The chemical and physical properties of synthetic membranes and separated particles as well as a choice of driving force define a particular membrane separation process. The most commonly used driving forces of a membrane process in industry are pressure and concentration gradients. The respective membrane process is therefore known as filtration. Synthetic membranes utilized in a separation process can be of different geometry and flow configuration. They can be also categorized based on their application and separation regime. The best known synthetic membrane separation processes include water purification, reverse osmosis, dehydrogenation of natural gas, removal of cell particles by microfiltration and ultrafiltration, removal of microorganisms from dairy products, and dialysis.

Access to clean water is an essential human necessity. Water purification is becoming a globally important issue. Building large civil infrastructures is one solution. Recently, more focus is being put on point-of-use solutions, and more particularly personalized solutions involving smaller devices. Nanofibre membranes might be used for water filtration, but a basic requirement is that such membranes need to have a high flux and high separation power. The latter property, in particular for bacteria and other health threatening species, cannot be compromised. However, there is need for increased water flux while retaining high separation power, to make personalized filtration devices better attainable.

Another problem occurring with nanofibre membranes is related to pleatability. Pleating is traditionally a Japanese technique. Through pleating special kinds of patterns known as pleats are created. Accordion type pleats are the most commonly used patterns. These patterns are created using heat, pressure and tension during which the fabric is folded upon itself into a accordion-like configuration. This process can be followed by placing the fabric in a heated chamber to permanently set the shapes. More details on pleating and pleating conditions can be found in the book: "Encyclopedia of textile finishing" by H. K. Rouette, Springer, ISBN 3-540-65031-8. In filtration applications, it is commonly known to pleat the filter medium in order to increase the effective surface area available for fluid impact. Pleating of filter material is applied extensively in e.g. air filters, such as particulate air filters and chemical air filters. A particulate air filter is a device composed of fibrous materials which removes solid particulates such as dust, pollen, mould, and bacteria from the air. A chemical air filter consists of an absorbent or catalyst for the removal of airborne molecular contaminants such as volatile organic compounds or ozone. Air filters are used in applications where air quality is important, notably in building ventilation systems and in engines. An air filter typically comprises many densely packed parallel layers made of a multiply pleated single layer of filter material. Pleating of the filter material is necessary to create a maximum in filter surface area in a small filter device. The filter material in such filters may consist of a nanofibre membrane layer coated, laminated or calendared onto a non-woven substrate. Both the nanofibre membrane layer and the non-woven substrate may consist of polymeric material. Pleating of such materials is typically done under pressure at elevated temperatures. During the pleating step the membrane layer can get defected, resulting in reduced separation efficiency.

The problem of the vulnerability of nanowebs to damaging is also known from e.g. US2010/0025892 and US2010/0107578. According to US2010/0025892 It is known that the lightweight nanofibre layer is vulnerable to damage in high mechanical stress applications, especially when the nanofibre layer is formed from fibres with diameters less than 500 nanometer (nm), and more typically, 100 nm. It is known that there are "shedding" problems where the nanofibres are shed from the filter media because of relatively weak attraction bonds between the nanofibres and the base media for conventional electro-spun fibres that rely on polarity attraction forces. Also, known electro-spun nanofibre layers are two dimensional in structure or a single fibre layer in thickness, and when the nanofibre layer cracks or breaks, dust can readily penetrate the base media substrate. After the nanofibre layer is damaged, dust is permitted to penetrate the base media and contribute to a rise in the operating pressure drop of the filter. Further, known media substrates also have mechanical stress limitations and are prone to deformation under high dust loading. US2010/0025892 proposes a particular process as a solution, wherein nanofibres of all kinds of different polymers, including polyester polymers and polyamide polymers, such as nylon-6, nylon-6,6, nylon-6, 6-6, 10, and the like can be used.

US2010/0107578 describes a method for electrostatic spinning of thermoplastic polymers for obtaining nanofibres. The thermoplastic polymer can be selected from a group consisting of different polymers including polystyrene, polyetherimides, polycarbonates, polybutylenterephthalates, polyethyleneterephthalates, polysulfones, polyethersulfones as well as polyolefins such as polypropylene and polyethylene, and polyamides selected from polyamide-6, polyamide-6.6, polyamide-6.10, and block copolymer polyamides, such as for example polyamide-6/6.6/13.6, whereby polystyrene is preferred. According to US2010/0107578, when using these thermoplastic polymer nano and/or microfibers as coating for fleece it becomes clear that the fibres deposited by the electrospinning process have a relatively poor adhesion property on the carrier fleece. This applies particularly to structured (studded) media. The contact surface for nanofibres is quite small, for only the elevations are covered with it. When using such structured media, minor forces (e.g. winding or unwinding of the coated fleece) can detach the nanofibres. If the coated fleece is mechanically stressed due to pleating or similar processing methods, the nano and/or microfibers on the carrier fleece are severely damaged. This applies in particular to abrasive shear forces which can be applied, for example, by roller systems required for manufacturing. The solution to the said problem claimed by US2010/0107578 is to add a thermoplastic elastomer (TPE) to the spinning solution comprising the thermoplastic polymer.

Thus there clearly is also a need for nanofibre membrane layers and membrane materials comprising such layers that have improved pleatability.

One object of the present invention is to a provide membrane material that has high water flux while retaining high separation power for bacteria and the like.

Another object of the present invention is to provide a membrane material that has improved pleatability characteristics.

According to the invention, there is provided a nanofibre membrane layer having a basis weight of 0.01-50 g/m2 and a porosity of 60-95%, comprising a nanoweb made of polymeric nanofibres with a number average diameter in the range of 50-500 nm and consisting of a polymer composition comprising a semicrystalline polyamide having a C/N ratio of at most 5.5.

The nanofibre membrane layer can be made by electrospinning of a polymer solution comprising the semicrystalline polyamide having the C/N ratio of at most 5.5 dissolved therein.

According to the invention, there is also provided a multilayered membrane construction comprising a first layer consisting of the said nanofibre membrane and a second porous layer. Additionally also multilayered construction in which the nanofibre membrane is sandwiched between two porous layers are possible.

The invention is further embodied by a water or air filtration device comprising the said nanofibre membrane layer, optionally comprised as a layer in a multilayered membrane structure.

The nanofibre membrane layer according to the invention combines a high water flux while retaining high separation power for bacteria, and also has good pleating properties.

It has surprisingly been found that the said nanofibre membrane layer is very efficient in separating bacteria and the like from water, in particular when used with a thickness in the higher range, while still retaining a high water flux. This opens up the possibility of making small water filtration devices already effective at low water pressure. A further advantage of the membrane layer according to the invention is that they do not need to be treated with surfactants or other surface active agents to improve the water flux, thus preventing leaching of such materials into the drinking water.

Water flux (in $l/m^2 \cdot h \cdot bar$) is herein defined as the amount of clean water (in l) that passes through a membrane material per hour at 1 bar per $m^2$ of the membrane material through which it passes. The membrane material can be, e.g. the nanofibre membrane layer, the membrane construction or the support layer. To this end, the water flux is determined by measuring the amount of water (in l) passing through a specific membrane surface area (in m2) during a specific time (in hours) at different transmembrane pressures (in bar) between 0 and 1 bar. The pressure at one side of the membrane (P1) is varied by varying the height of the water column on the membrane and/or the air pressure on the water column, while at the same time keeping the pressure at the other side of the membrane (P2) constant. P2 is typically the ambient air pressure. The transmembrane pressure (Pt) is then calculated as: Pt=P1−P2. For each measurement the actual flux calculated in $l/m^2 \cdot h$ is plotted against the value of Pt and the linear regression line passing through the origin is calculated. The resulting line is used to calculate the slope of that line, representing the water flux (in $l/(m^2 \cdot h \cdot bar)$) at 1 bar.

On the other hand it has also been found that the said nanofibre membrane layer, even more so at lower thickness, and in particular after annealing, has very good pleating properties. This opens up the possibility of making air filters with even lower thickness or with higher efficiency.

The term 'nanofibres', as used herein, refers to fibres having a number average diameter of at most 1000 nm (1 μm).

To determine the number average diameter (d) of the fibres, ten (10) scanning electron microscopy (SEM) images at 5,000× magnification were taken of each nanofibre membrane sample or web layer thereof. The diameter of ten (10) clearly distinguishable nanofibres was measured from each photograph and recorded, resulting in a total of one hundred (100) individual measurements. Defects were not included (i.e. lumps of nanofibres, polymer drops, intersections of nanofibres). The number average diameter (d) of the fibres was calculated from the one hundred (100) individual measurements.

In the context of the invention, with a nanoweb made of polymeric nanofibres is meant a nonwoven web comprising primarily, or even exclusively polymeric nanofibres. The nanofibre membrane layer may comprise, next to the nonwoven web of nanofibres, other components, which may, for example, be absorbed by, adhered on or included in the nanoweb. However, in order to attain a high flux, the amount of components other than the nanofibres should be limited, if not absent at all.

Preferably, the polymeric nanofibres are present in an amount of at least 80 wt. %, more preferably at least 90, and most preferably is in the range of 95-100 wt. %, relative to the total weight of the nanofibre membrane layer.

With the expression 'basis weight' of the nanofibre membrane layer is meant the average weight per square meter. The basis weight can be measured using ASTM D-3776, which is hereby incorporated by reference.

In a preferred embodiment of the invention, the nanofibre membrane layer has a basis weight is in the range of 0.01-2.0 g/m2, more preferably 0.05-1.0 g/m2, and even more preferably 0.1-0.5 g/m2. The advantage such a relatively thin membrane layer is that the pleatability characteristics are improved, while particle separation characteristics are retained. Such a thin layer is suitably produced as a coating on a non-woven substrate, and applied in a device for air filtration.

In another preferred embodiment of the invention, the nanofibre membrane layer has a basis weight between 1 and 50 g/m2, more preferably in the range 2 and 20 g/m2, and still more preferably 3-10 g/m2 The advantage of such layers with mediate thickness is that the separation power for bacteria and the like is improved and the water flux is retained a high level. Suitably, the layer is incorporated in a multilayer membrane construction, and applied for water filtration. Furthermore, the membrane filter can consist of multiple nanowebs each having a specific average fibre diameter and forming a nanofibre gradient membrane. WO2008/142023 A2 describes for example how to spin a multiple layer gradient nanoweb. For instance, a two layer nanoweb, wherein for examples one layer is prepared from nanofibres having a number average diameter in the range of from 500 to 600 nm and the top layer is prepared from nanofibres having a number average diameter in the range of from 100 to 200 nm, may be used.

With the expression "membrane construction" is meant a collection of layers comprising at least a membrane layer and a second porous layer together forming the membrane construction. With the expression 'multiple layers' is meant at least two layers. Each of the layers differs from the other layer or others layers in mean flow pore size and/or type of material.

It is known to the skilled person how to prepare a membrane construction comprising multiple layers, for example by spinning the nanofibres on a moving support layer (coating) or by laminating the support layer with the membrane layer. In order to attach the membrane layer to the other layer or layers, hot laminating may be used and/or glue may for example be applied onto the support material and/or the support layer may be in a hot-melt state when the membrane layer is applied thereon.

The number average diameter of the nanofibres in the nanofibre membrane layer according to the invention may vary over a wide range, and preferably is in the range of 80-400 nm, more preferably 100-300 nm. For example, the number average diameter of the nanofibres is in the range of 150-200 nm.

The nanofibre diameter can be reduced e.g. reducing the solution concentration or modifying the process conditions (applied voltage, solution flow rate, spinning distance).

The desired number average diameter of the nanofibre can be achieved by routine experimentation. Factors that may influence the number average diameter of the nanofibre are the viscosity of the polymer solution used to make the nanofibres (usually between 200 and 1000 mPa·s), the electrical voltage, the flow rate of the polymer solution and the choice of polymer.

The nanofibres in the inventive membrane layer may have various shapes, although the fibres preferably have a cross section with a circular or semi circular shape rather than a ribbon like shape. This circular or semi circular shape has the advantage that the porosity of the membrane layer is better retained after calendaring or pleating. The shape of the fibres can be defined according to the dimensions of the cross-section. A fibre has a semi-circular shape when the cross section of the fibre has a largest diameter (L) and a smallest diameter (S) with a ratio S/L of at least 0.5. For a circularly shaped cross section S/L is 1, which is the maximum. For a ribbon like cross section S/L is typically 0.2 or less.

The nanofibre membrane layer according to the invention has porosity in the range of 60-95%, more suitably in the range of 70-90%. A high porosity is suitably obtained with thinner microfibers, whereas a lower porosity is generally obtained with relative thicker fibres. The porosity might also be reduced by subjecting the nanofibre membrane layer to a calendaring step under elevated pressure. Next to a reduced porosity the calendaring improves the strength of the membrane and the adhesion between the different nanofibres within a nanoweb layer as well as between the nanofibres and an optionally present substrate or other nanoweb layers.

The porosity (P) of the nanofibre membrane layer (expressed in percentage of the volume of the nanofibre membrane layer) is the difference between 100% and the solidity (S) of the nanofibre membrane layer: porosity=100%−% solidity. The solidity (S) can be calculated with formula 1, $$S = \frac{W}{\rho * T} \times 100 \qquad \text{(Formula 1)}$$

wherein the basis weight (W) of the nanofibre membrane layer sample (in g/m$^2$) determined as described herein, is divided by the density ($\rho$) of the polymer composition from which the nanofibre is made (in g/cm$^3$) and by the sample thickness (T) (in μm) and multiplying by 100.

Sample thickness (T) is determined by ASTM D-645 (or ISO 534), which method is hereby incorporated by reference, under an applied load of 50 kPa and an anvil surface area of 200 mm$^2$. The density ($\rho$) of the polymer composition is measured as described in ISO1183-1:2004.

The nanofibre membrane layer according to invention suitably has pores with a mean flow pore size in the range of 0.01-2 μm. The mean flow pore size of the nanofibre membrane layer is preferably in the range of 0.05 to 1 μm, and even better 0.1-0.5 μm.

The mean flow pore size is determined according to ASTM E 1294-89, "standard test method for pore size characteristics of membrane filters using automated liquid porosimeter" by using automated bubble point method from ASTM designation F 316 using a capillary flow porosimeter (model number CFP-34RTF8A-3-6-L4, Porous Materials, Inc. (PMI), Ithaca, N.Y.).

The mean flow pore size of the nanofibre membrane layer may be reduced by calendaring the nanofibre membrane layer and/or the nanofibre membrane layer in combination with the support layer. This may increase the strength of the nanofibre membrane layer and/or the nanofibre membrane layer in combination with the support layer. Calendaring is the process of passing sheet material (in this case the nanoweb or the nanofibre membrane layer with the nanoweb therein integrated) through a nip between rolls or plates.

The mean flow pore size (of the nanofibre membrane layer) is influenced by a combination of the thickness of the nanofibre membrane layer and the number average diameter of the nanofibres. For example, by increasing the thickness, the mean flow pore size may be reduced. By reducing the number average diameter of the nanofibres, the mean flow pore size can also be reduced.

A semicrystalline polymer is herein understood to be a polymer having a multi-phase structure when present in the solid state, comprising a crystalline phase and an amorphous phase. Such a polymer, when heated, typically shows a glass transition for the amorphous phase and a melting point for the crystalline phase.

Suitably, the semicrystalline polyamide which is used in the present inventions has a melting temperature of at least 260° C., preferably at least 280° C. The melting temperature may be as high as 330° C., but suitably is at most 310° C.

Also suitably the semicrystalline polyamide in the nanofibre membrane layer according to the invention has a melting enthalpy of at least 70 J/g. Preferably the melting enthalpy is at least 85 J/g, more preferably at least 100 J/g.

Crystalline polymers have a melt temperature ($T_m$) and do not have a glass transition temperature ($T_g$). Semi-crystalline polymers have both a melt temperature ($T_m$) and a glass transition temperature ($T_g$), whereas amorphous polymers only have a glass transition temperature ($T_g$) and do not have a melt temperature ($T_m$).

With the term glass transition temperature (Tg) is herein understood the temperature, measured according to ASTM E 1356-91 by DSC with a heating rate of 10° C./minute and determined as the temperature at the peak of the first derivative (with respect of time) of the parent thermal curve corresponding with the inflection point of the parent thermal curve.

With the term melting point (temperature) is herein understood the temperature, measured according to ASTM D3418-97 by DSC with a heating rate of 10° C./min, falling in the melting range and showing the highest melting rate, of the first heating curve.

With the term melting enthalpy is herein understood the enthalpy, measured according to ASTM D3418-97 by DSC with a heating rate of 10° C./min, associated with melting peaks falling in the melting range of in the range of 260-330° C. of the first heating curve.

Glass transition temperature ($T_g$) measurements (inflection point) and melting temperature ($T_m$) measurements are carried out via differential scanning calorimetry (DSC) on a Mettler Toledo, TA DSC821, in $N_2$ atmosphere and at a heating rate of 5° C./min. melting temperature ($T_m$) and glass transition temperature ($T_g$) were determined using the second heating curve.

These DSC measurements are done under nitrogen, with a pre-dried sample mass of about 3-5 mg. Pre-drying was done for 24 hours at 90° C. under nitrogen.

The weight average molecular weight (Mw) of the thermoplastic polyamide is preferably at least 10,000, for example at least 25,000 and/or at most 50,000, for example at most 40,000, for example at most 35,000 g/mol.

The semicrystalline polyamide in the nanofibre membrane according to the invention may vary broadly in composition, as long as the C/N ratio is at most 5.5. The C/N ratio is herein understood to be ratio between the number of carbon atoms (C) in the polyamide and the number of nitrogen atoms (N) in the polyamide. Preferably the C/N ratio of the semicrystalline polyamide is in the range of 4.5-5.5.

Such polyamides may be prepared from polyamide 46 (C/N=5), polyamide 44 (C/N=4), and polyamide 26 (C/N=4), and mixture and copolymers of combinations thereof, as well as mixtures and copolymers thereof with for example polyamide 6 (C/N=6); polyamide 6,6 (C/N=6); polyamide 4,10 (C/N=7); polyamide 6,10 (C/N=8); and polyamide 6,T (C/N=7) and polyamide 4T (C/N=6).

In a preferred embodiment, the semicrystalline polyamide is a polyamide 46 homopolymer or a polyamide copolymer comprising (i) at least 50 wt. % of repeat units derived from 1,4 butane diamine and adipic acid and (ii) at most 50 wt. % of repeat units derived from other diamines, other dicarboxylic acids, and esters or anhydrides thereof, and/or amino acids and cyclic lactams thereof. More preferably the repeat units (i) are present in an amount of at least 50 wt. %, preferably at least 75 wt. %, relative to the total weight of the polyamide.

Polyamide 46 homopolymer consists of repeat units derived from 1,4 butane diamine, which has 4 C atoms and 2 N-atoms, and adipic acid, which has 6 C-atoms. If the nanoweb is made from nanofibres made from these preferred thermoplastic polyamides, the nanofibre membrane layer will have improved hydrophilicity and/or an improved water flux, which makes the nanofibre membrane layer even more suitable for the uses described herein. Furthermore, advantages may be improved tensile strength and/or an increased thermal stability and/or hydrolysis resistance.

Hydrophilicity respectively hydrophobicity of a surface can be determined via the advanced contact angle made by a liquid, for example water using ASTM D7334-08. If a surface, for example the nanofibre membrane layer, shows an advanced contact angle with water of at least 90°, the surface is considered hydrophobic. If a surface, for example the nanofibre membrane layer, shows an advanced contact angle with water of less than 90°, the surface is defined herein as hydrophilic. Preferably, the nanofibre membrane layer is hydrophilic, more preferably, the nanofibre membrane layer has a contact angle as measured with water using ASTM D7334-08 of less than 80°, for example less than 70°, for example less than 60°, for example less than 50°, for example less than 45°.

The polymer composition from which the nanofibres in the membrane layer according to the invention is made suitably comprises at least one other component next to the semicrystalline polyamide.

In the polymer solution comprising the polymeric material of choice used to prepare to nanofibres, additives may be present. Suitable additives include but are not limited to: surface tension agents or surfactants, for example perfluorinated acridine, crosslinking agents, viscosity modifiers, for example hyperbranched polyamide polymers, electrolytes, antimicrobial additives, adhesion improvers, for example maleic acid anhydride grafted rubber or other additives to improve adhesion with a polypropylene or polyethylene terephthalate substrate, nanoparticles, for example nanotubes or nanoclays, and so on. Examples of electrolytes include water soluble metal salts, for example metal alkali metal salts, earth alkali metal salts and zinc salts, LiCl, HCOOK (potassium formate), $CaCl_2$, $ZnCl_2$, $KI_3$, $NaI_3$. Preferably, an electrolyte is present in an amount in the range of from 0 to 2 wt % relative to the total weight of the polymer solution. The water soluble salt may be extracted with water from the nanofibres produced, thereby obtaining microporous nanofibres.

Preferably, the polymer composition comprises a thermally stabilizer. The effect is that the thermal stability of the nanofibres in the membrane according to the invention, which is already very high, is further increased.

Thermal stability is measured by heating the sample to be tested (e.g. the nanofibre membrane layer, the membrane construction or the support layer) in an oven at an elevated temperature and measuring the tensile strength of the sample over time.

Although the polymer composition may comprise other components, the semicrystalline polyamide is preferably present in an amount of at least 60 wt. %, more preferably at least 85 wt. %, relative to the total weight of the composition.

The nanofibre membrane layer according to the invention can be made by a process comprising electrospinning of a polymer solution comprising the semicrystalline polyamide having the said C/N ratio of at most 5.5 dissolved therein on a moving substrate, and optionally one or more other components also dissolved or dispersed in the polymer solution. In such a process a polymer solution is introduced into an electric field, and nanofibres are formed under the effect of said electric field. The nanofibres so formed are typically deposited on a substrate. By performing the electrospinning process in a semi-continuous manner, and using a movable substrate, a semicontinuous layer of deposited nanofibres is formed. For the electrospinning process any suitably technology may be applied, including methods known to the skilled person, multi-nozzle electrospinning with the use of multi-nozzle devices, typically a spinneret with a series of nozzles, and via nozzle-free electrospinning with the use of nozzle free devices, for example using a Nanospider™ apparatus or bubble-spinning. Multi nozzle spinning may optionally be combined with a forced air flow around the nozzles, as in electro-blowing. Classical electrospinning is illustrated in U.S. Pat. No. 4,127,706, hereby incorporated by reference. In such processes Taylor cones are formed from the solution either from the nozzles of from a free standing liquid when applying a high voltage. To create such Taylor cones the voltage typically has to be at least 2.5 kV. The voltage may be as high as 50 kV or 60 kV or even higher, e.g. 65 kV. Suitably the voltage is at least 10 kV, preferably at least 20 kV and more particular at least 30 kV. A voltage sufficiently high to form Taylor cones is also referred as a high voltage.

Typically such an electrospinning process being either a multi-nozzle electrospinning process with the use of a multi-nozzle device or a nozzle-free electrospinning with the use of nozzle free device, comprises steps wherein
- a high voltage is applied
- a polymer solution comprising a polymer and a solvent is fed to the multi-nozzle device or the nozzle free device and transformed under the influence of the high voltage into charged jet streams
- the jet streams are deposited on a substrate or taken up by a collector, and
- the polymer in the jet streams solidifies thereby forming nanofibres In a special embodiment, the invention relates to a process for the preparation of nanofibres using an electrospinning process comprising the steps of:
- applying a high voltage between a spinneret comprising a series of spinning nozzles and a collector, or between a separate electrode and a collector
- feeding a stream of polymer solution comprising a polymer and a solvent to the spinneret
- whereby the polymeric solution exits from the spinneret through the spinning nozzles and transforms under the influence of the high voltage into charged jet streams,
- whereby the jet stream are being deposited on or taken up by the collector or a support layer
- whereby the polymer in the jet stream solidifies prior to or while being deposited on or taken up by the collector or the support layer whereby the nanofibres are formed.

After preparation of the nanofibres, the nanofibres may be post-stretched, washed, wetted with a liquid, dried, cured, annealed and/or post condensed. It may be advantageous to dry the nanofibres to remove residual solvents which may interfere with the water filtration using the membrane construction of the invention.

Suitably the electrospinning step is combined with a step, or a combination of steps, applied after the electrospinning step, wherein the deposited layer is calendared or annealed.

In a preferred embodiment an annealing step is applied. It has been observed that annealing of the membrane layer at elevated temperature, even for a short time span, results in a significant improvement of the performance of the membrane layer in a pleating process.

For the annealing step the nanofibres are heated for a certain period to a temperature above 200° C., and preferably to a temperature in the range of 220-270° C. However, already heating the polymer fibres according to the present invention for several minutes at temperature in the range of 220-270° C. results in a significant increase of the molecular weight in combination with improved mechanical properties. Suitably, for the annealing the membrane layer is kept for a period of 15 minutes to 2 hours, at a temperature of 220-260° C. A higher temperature, such as from 230-250° C., allow for shorter annealing times of 15-30 minutes, which might be well integrated in a semi-continuous electrospinning process.

The nanofibre membrane layer according to the invention may well be integrated with a second porous layer in a multilayered membrane construction. The second porous layer advantageously consists of a nonwoven web or of a second nanofibre membrane layer.

The membrane construction of the invention suitably comprises at least one support layer. The support layer may be any substrate on which the nanofibre membrane layer can be added, for example a non-woven cloth, any fibrous substrate, or a filter or membrane layer, for example a microporous membrane.

The basic weight of the support layer is in principle not critical and may for example be in the range of from 1 to 300 g/m2.

Preferably, the mean flow pore size of the support layer is at least 0.1 μm, preferably more than 1 μm. A large pore size for the support layer is advantageous to keep a flux for the membrane construction. This is not critical for the separation power, since that is provided by the membrane layer.

The water flux of the support layer is preferably at least 10,000, more preferably at least 20,000, for example at least 30,000 $l \cdot h^{-1} \cdot m^{-2}$ if measured at atmospheric pressure (1 bar). This is advantageous in case the membrane layer is applied in a water purification filter.

For water filtration applications, the support layer is preferably also hydrophilic; the support layer may be prepared from hydrophilic materials or if the support layer is prepared from hydrophobic material, the support layer may be coated with a hydrophilic coating.

For air filtration preferably a PP or PET nonwoven is chosen for the support layer.

More preferably, the support layer has a contact angle as measured with water using ASTM D7334-08 of less than 80°, for example less than 70°, for example less than 60°, for example less than 50°, for example less than 45°.

Examples of non-woven cloths include for example a meltblown nonwoven cloth, needle-punched or spun-laced nonwoven cloth, woven cloth and knitted cloth.

Examples of any fibrous substrates include, paper, any fibrous substrate comprising selected from the group of materials comprising glass, silica, metals, ceramic, silicon carbide, carbon, boron, natural fibres such as cotton, wool hemp or flax, artificial fibres, such as viscose or cellulosic fibres, synthetic fibres, for example polyester, polyamides, polyacrylics, chlorofibers, polyolefines, synthetic rubbers, polyvinylalcohol, aramides, fluorofibers, phenolic.

Preferably, the nanofibre membrane layer and the support layer are in contact with one another, as this may provide mechanical support and/or a reduced amount of so-called 'dead volume', that is the amount of liquid to be separated that stays inside the membrane construction rather than flowing through.

Ultimately, the nanofibre membrane according to the invention, or the multilayered membrane structure according to the invention, is comprised by a filtration device, more particular a water or air filtration device. In a preferred embodiment the membrane layer has a pleated configuration, more particular an accordion-like configuration. For the pleating of the membrane, standard pleating equipment and processes can be used.

It appeared that in such an air filter the nanofibre membrane according to the invention based on a semicrystalline polyamide with a C/N ratio of at most 5 performed better than a corresponding nanofibre membrane based on polyamide 6, which has a C/N ratio of 6.

Preferably, the air filter comprises a nanofibre membrane layer according to the invention, optionally coated on nonwoven substrate, wherein the basis weight is in the range of 0.01-1.0 g/m$^2$, more preferably 0.1-0.5 g/m$^2$, a porosity of 60-90%, and wherein the polymeric nanofibres have a number average diameter in the range of 100-300 nm. Suitably, the air filter is a particulate air filter or a chemical air filter, wherein the membrane layer constitutes part of a pleated stack of filter material.

The water filtration device suitably is a water purification device comprising an expandable water collecting device. Such a device is described in WO09073994A, which is incorporated herein by reference. Preferably, the membrane layer herein constitutes part of a multilayer construction with a gradient.

It appeared that in such a water filter the nanofibre membrane according to the invention based on a semicrystalline polyamide with a C/N ratio of at most 5 performed better than a nanofibre membrane based on polyamide 6, which has a C/N ratio of 6.

Preferably, the water filter comprises a nanofibre membrane layer according to the invention, wherein the basis weight is between 1 and 20 g/m$^2$, more preferably 2-10 g/m$^2$, a porosity of 80-95%, and wherein the polymeric nanofibres have a number average diameter in the range of 100-400 nm.

The invention also relates to the use of the membrane construction, the membrane cassette or of the device of the invention for the use of any one of the following applications: molecular separations and filtration, like gas/gas filtration, hot gas filtration, particle filtration, liquid filtration such as micro filtration, ultra filtration, nano filtration, reverse osmosis; waste water purification, oil and fuel filtration; electrochemical applications, including electro-dialysis, electro-deionization, batteries (e.g. battery separators) and fuel cells; controlled release applications including pharmaceutical and nutraceutical components; pertraction, pervaporation and contactor applications; immobilization of enzymes, and humidifiers, drug delivery; (industrial) wipes, surgical gowns and drapes, wound dressing, tissue engineering, protective clothing, catalyst supports, and various coatings.

The invention will now be elucidated with the following examples, without however being limited thereto.

Materials

PA46 Polyamide 46 polymer, linear, Mw 34.000 g/Mol, prepared internal DSM using standard polymerization method.

PA6 Polyamide 6 polymers, linear, Mw 30,000 g/Mol, both prepared internal DSM using standard polymerization methods.

Formic acid Industrial grade, 95% formic acid, 5% water.

Methods

Preparation of Nanofibre Membrane Layers

Nanofibre membranes were spun from a solution of polymer in formic acid/water (85 wt. % formic acid) on a paper substrate using a multi-nozzle electrospinning set-up. The spinning distance and the voltage applied were fixed on 10 cm and 32 kV, respectively. The relative humidity and the air temperature inside the spinning device were controlled on 30% RH and 25° C. In order to protect the nanofibre membranes a paper was also placed on top of the membrane. Results have been reported in Table 1. Where applicable a non-woven PET web layer (parafilRT80 from Twedierdorf GmbH and Co. KG, Dierdorf, Germany) was used in stead of the paper substrate. The thus produced coated non-woven was wound-up during production. All the membrane layers so produced had a width of 1 meter.

Characterization of Nanofibres: Fibre Diameters, Number Average and Distribution and Standard Deviation To determine the number average diameter of the fibres, ten (10) samples were taken from a nanofibre web layer and scanning electron microscopy (SEM) images at 5,000× magnification were taken for each. The diameter of ten (10) clearly distinguishable nanofibres is measured from each photograph and recorded, resulting in a total of one hundred (100) individual measurements. Defects are not included (i.e. lumps of nanofibres, polymer drops, intersections of nanofibres). The fibre diameter distribution consists of these hundred individual measurements. From these one hundred (100) individual measurements, the number average diameter (d) of the fibres and the standard deviation (S) is calculated.

Mean Flow Pore Size

The mean flow pore size is determined according to ASTM E 1294-89, "standard test method for pore size characteristics of membrane filters using automated liquid porosimeter" by using automated bubble point method from ASTM designation F 316 using a capillary flow porosimeter (model number CFP-34RTF8A-3-6-L4, Porous Materials, Inc. (PMI), Ithaca, N.Y.) To this end, individual samples are wetted with low surface tension fluid (1,1,2,3,3,3-hexafluoropropene, or "Galwick", having a surface tension of 16 dyne/cm). Each sample is placed in a holder and a differential pressure of air is applied and the fluid is removed from the sample. The differential pressure at which wet flow is equal to one-half the dry flow (flow without wetting solvent) is used to calculate the mean flow pore size using the supplier's software. Bubble Point refers to the largest pore size.

Air Permeability of Nanofibre Membranes

Air permeability refers to the Frazier or differential pressure air permeability test and was measured according to ASTM F778 "Standard methods for gas flow resistance testing of filtration media". For the measurement an NBS instrument was used. A differential pressure, adjusted and calibrated with a water column (usually 0.5 inches), was set across a sample and the resulting air flow in cubic feet per minute (CFM) at that differential pressure was measured with a calibrated venturi nozzle in an orifice plate type of arrangement.

Preparation of Various Samples

Comparative Experiment A

A nanoweb with a basis weight of 1.9 g/m$^2$ on a paper foil was prepared from a polyamide solution of polyamide 6 in formic acid/water (85/15) by the electrospinning process as described hereabove.

Comparative Experiment B

A nanoweb with a basis weight of 1 g/m$^2$ on a non-woven polyester support was prepared from a polyamide solution of polyamide 6 in formic acid/water (95/5) by the electrospinning process as described hereabove. The thus produced coated non-woven was wound-up during production. The solution used had a viscosity of about 600 mPa·s and a polymer concentration of about 15 wt. %, relative to the total weight of the solution.

Example I

Example I was prepared in the same way as Comparative Experiment A, except that polyamide 4,6 in stead of polyamide 6 was used.

Example II

Example II was prepared in the same way as Example I, except that a solution.

Example III

Example III was prepared in the same way as Example II, except that polymer solution comprised a sterically hindered phenolic antioxidant, in an amount of 0.5 wt. % relative to the weight of the polymer.

Example IV

Example IV was prepared in the same way as Example II, except that polymer solution comprised CuI/KI stabilizer, in an amount of 0.5 wt. % relative to the weight of the polymer.

Example V

Example V was prepared in the same way as Comparative Experiment B, except that polyamide 4,6 in stead of polyamide 6 was used.

The main characteristics of the nanofibre membrane and corresponding test results are shown in the below table.

TABLE 1

Main characteristics of nanofibre membrane webs of Comparative experiments A and B and Examples I-V.

| Sample Reference | CE-A | CE-B | EX-I | EX-II | EX-III | EX-IV | EX-V |
|---|---|---|---|---|---|---|---|
| Polymer | PA6 | PA6 | PA46 | PA46 | PA46 | PA46 | PA46 |
| Mw [kg/mol] | 30 | 30 | 34 | 34 | 34 | 34 | 34 |
| Basic weight [g/m2] | 1.9 | 1 | 1.9 | 1.9 | 1.9 | 1.9 | 1 |
| Aver. Fibre Diameter [nm] | 130 | 95 | 145 | 160 | 160 | 160 | 123 |
| Porosity [%] | | | 88.8 | | | | |
| Aver. Pore size [μm] | 0.18 | | 0.22 | 0.35 | 0.35 | 0.36 | |
| Melting enthalpy [J/g] | 69 | | 95 | | | | |
| Air Permeability [cfm] | | 57.8 | | | | | 57.4 |

The nanofibre membranes, being either the nanowebs as such, or on the support layer, were tested on either pleating and mechanical properties, or water permeability and separation efficiency.

Heat Stability Membranes

Nanofibre membranes of 1.9 g/m2 of Comparative Example A and Examples I and IV were fixed in metal frame and placed in a forced circulation heat convection oven at a temperature of 165° C. in air. The membranes were kept in the oven for several times (5, 10, 16, 20, 40, 80 hours). After the heat ageing period the samples were taken out of the metal frame and placed between two papers.

Tensile Properties of Nanofibre Membranes

Tensile strength and elongation were measured according to ASTM D5035-95 "standard test method for breaking force and elongation of textile fabrics (strip method) on an Instron Tensile tester at 23° C. Only the sample preparation was different from ASTM D5035-95. In contrast with above cited ASTM standard, 15 mm wide and 80 mm long strips of membranes were punched out in the machine direction. The machine direction means the direction in which the length of the fabric is produced on the machine that produces it. The elongation at break and tensile strength of these membrane strips were measured. The tensile strength was reported as kg/15 mm. Results of relevant tests are reported in Table 2.

TABLE 2

Mechanical properties after heat ageing at a temperature of 165° C. in air.

| | CE-A | | EX-I | | EX-IV | |
|---|---|---|---|---|---|---|
| Ageing time (hrs) | E (%) | TS (kg/15 mm) | E (%) | TS (kg/15 mm) | E (%) | TS (kg/15 mm) |
| 0 | 24.8 | 0.37 | 24.8 | 0.39 | 23.1 | 0.39 |
| 10 | <5 | <0.10 | 13.2 | 0.19 | 13.5 | 0.25 |
| 15 | F | F | n.m. | n.m. | n.m. | n.m. |
| 20 | | | 11.8 | 0.09 | 10.87 | 0.16 |
| 40 | | | F | F | 10.5 | 0.18 |
| 90 | | | | | 9.1 | 0.13 |

F = failure: impossible to measure the properties due to breakage of sample during handling (e.g. taking out of oven or metal frame or by placing in tensile tester) - material too brittle.

The results clearly show that the performance of the nanofibres according to the present invention is much better than that according to the prior art.

Annealing of Nanofibre Membranes

Nanofibre membranes of 1.9 g/m2 of Comparative Example A and Example I were fixed in metal frame and placed in forced circulation heat convection oven in nitrogen for different periods (1 and 2 hours). For PA46 nanofibres the temperature was set 230° C. For PA6 nanofibres the temperature was set at 180° C., since at 230° C. the membrane material immediately crumbled. After annealing the samples were taken out of the metal frame and placed between two papers.

Dynamic Mechanical Torsion Analysis Measurements

The dynamic mechanical measurements were done in accordance with ASTM D5026 on equipment of the firm Rheometrics called RSA-III (Rheometrics Solids Analyser III) at a frequency of 1 Hz, applying a strain sweep and a temperature sweep. Sample strips with dimensions 2 mm and 40 mm were punched out of the nanofibre membrane sandwiched between two papers. Before the measurement the papers were partially peeled off from the nanofibre membrane sample and the sample was placed in the upper clamp of the RSA. After attaching to the upper clamp, the remaining paper was removed and the nanofibre membrane was also placed in the lower clamp. The distance between the clamps was 25 mm. The thickness of the nanofibre membrane was measured with the calibrated Heidenhain thickness meter. The strain sweep was measured at room temperature at 23° C. and a strain area of 0.01 up to 10%. During these measurements the storage modulus (E'), the loss modulus (E") and the tangent delta (tan δ) as function of the strain were defined. The temperature sweep was measured over a temperature area of −130° C. tot 250° C. with a heating speed of 5° C./min. During the measurements the storage modulus (E'), the lost modulus (E") and the tangent delta (tan δ) as function of temperature were measured. The storage modulus at 140° C. is reported in Table 3 relative to its value of the non-annealed nanofibre membrane, i.e. the value at the start of the experiment (time 0) is taken as 100%.

TABLE 3

| Retention of stiffness measured by DMTA, as function of annealing time | | |
|---|---|---|
| Sample reference | EX-I | CE-A |
| Annealing temp. (° C.) | 230 | 180 |
| Annealing time (hrs) | | |
| 0 | 100% | 100% |
| 1 | 144% | 95% |
| 2 | 166% | 93% |

The results clearly show that the performance of the nanofibre membrane according to the present invention is much better than that according to the prior art. More particularly, the properties of the nanofibre membrane of Example I increase significantly upon annealing, even the temperature to which the fibres were disposed was much higher, whereas those of the nanofibre membrane of Comparative Experiment A rather decreased somewhat.

Damage Nanofibre Membranes During Handling/Testing/Processing

In Comparative Experiment B and Example V nanofibre membrane layer coated on a polyester non woven substrate were produced and wound-up. After production the coated membrane was tested and screened on defects/possible holes in the membrane.

Over the width of the coated membrane 15 areas of 1 mm2 at equal distance from each other were screened using SEM on possible defects/holes. Only very few holes were observed for Example V according to the present invention (about 5 points) compared to Comparative Experiment B (about 23 points).

Simulated Pleating Test

The webs of Comparative Experiment B and Example V were pleated according to the following procedure. Pleating trials were conducted on a laboratory device consisting of double blades of a saw tooth structure with a pleating depth of 30 mm, wherein the membranes were pleated. A membrane sheet with a width of 10 cm was put into the device, pleated, taken out and the pleated package was put in an oven at 160° C. with a weight of 1 kg on top of it. After 30 minutes the pleated membrane was taken out and inspected on pleat definition and uniformity, delamination, separation and other damages. The pleated membrane of Comparative Experiment B shows significant defects while that of Example V showed a very good performance.

Water Permeability Test

The water flux was tested on a membrane of Example I with a diameter of 40 mm using a water column above the membrane in combination with an increased air pressure to adjust to a specified transmembrane pressure. All experiments were performed with clean water at 23° C. By recording the required time to drain a certain quantity of water for the specific membrane surface the water flow rate [l/m2h] is obtained for the applied transmembrane pressure. The experiments were performed at transmembrane pressures of 20, 50 and 100 mbar. The slope of the resulting curve is considered the water flux. The water flux thus measured for Example I was 12,500 $l/m^2 \cdot h \cdot bar$.

Next to water flux of clean water also the flow rate of standardized contaminated water was measured during 60 minutes.

The results of Example I are compared with that of microporous polyethelyne layer (available under the tradename Solypor from Lydall) coated with a PA46 layer (Comparative Experiments C and D). The results are reported in table 4 as the time needed to filter 1 L of said standardized contaminated water.

Bacteria Separation Efficiency

In order to determine the bacteria separation efficiency of the membranes, a standardized contaminated water was used in test of the water flux measurement. The standardized contaminater consisted of 10.000 aerobic germs/ml, 8000 E-coli per 100 ml and 100.000 Enterocci per 100 ml. After preparation the contaminant was stored in the refrigerator and was only used up to two days after preparation to avoid significant growth of the bacteria.

In order to quantify the concentration of bacteria colonies of the standardized contaminated water prior to the filtration test and of the filtered water, use was made of the bacteria count test with the Quanti Discs™ of Idexx. Four ml of the water to be investigated was placed into the Quanti-Discs. These discs were then placed for 44 hours in an incubator at 36 C in order to let the remaining bacteria colonies in the water grow. With a UV light, the numbers of active (uplightin under UV light) fields were counted. Using the standardized Quanti-Disc datasheets (according to ISO Standard 6222), the number of active fields can be translated to the most probable number of active bacteria colonies per ml (MPN/ml). According to the above described analysis the standardized contaminated water contained 150 MPN/ml.

For the tests membrane of Example microporous polyethelyne layer (available under the tradename Solypor from Lydall) coated with a PA46 layer have been used. The results are reported in table 4.

TABLE 4

Filtering of contaminated water and Bacteria separation efficiency for Example I and Comparative Experiments C and D.

| Sample reference material | EX-I PA-46 based | CE-C PE-based with PA-46 coating | CE-D PE-based with PA-46 coating |
|---|---|---|---|
| Layer thickness (mm) | 0.22 | 0.04 | 0.33 |
| Time to filter 1 L contaminated water | 19.1 (10 mbar) | 25 (10 mbar) | 30 (30 mbar) |
| Bacterial count [MPN/ml] | 0 | 78 | 16 |

The results show that the membrane of Example I according to the invention shows a high water flux in combination with a very low bacterial count, whereas the comparative experiments show ether a comparable flux at the same pressure, but a much higher bacterial count (CE-C, with a much lower layer thickness) whereas the membrane of CE-D, having a higher thickness, at the cost of a recued flux, compared to CE-C, still has a significant bacterial count.

The invention claimed is:

1. A nanofiber membrane layer comprising a nanoweb made of polymeric nanofibers with a number average diameter in the range of 50-600 nm, the polymeric nanofibers consisting of a polymer composition comprising a semicrystalline polyamide having a C/N ratio of at most 5.5, wherein the nanofiber membrane layer has a basis weight of 0.01-50 $g/m^2$, a porosity of 60-95% and a mean pore size in a range from 0.01 to 2 μm.

2. The nanofiber membrane layer according to claim 1, wherein the basis weight of the nanofiber membrane layer is in the range of 0.01-1.0 $g/m^2$.

3. The nanofiber membrane layer according to claim 1, wherein the basis weight of the nanofiber membrane layer is between 1 and 20 $g/m^2$.

4. The nanofiber membrane layer according to claim 1, wherein the number average diameter of the polymeric nanofibers is in the range of 80-300 nm.

5. The nanofiber membrane layer according to claim 1, wherein the number average diameter of the polymeric nanofibers is in the range of 100-200 nm.

6. The nanofiber membrane layer according to claim 1, wherein the C/N ratio is in a range of 4.5-5.5.

7. The nanofiber membrane layer according to claim 1, wherein the semicrystalline polyamide has a melting temperature of at least 260° C.

8. The nanofiber membrane layer according to claim 1, wherein the semicrystalline polyamide has a melting enthalpy of at least 80 J/g.

9. The nanofiber membrane layer according to claim 1, wherein the semicrystalline polyamide has a melting temperature of at least 280° C.

10. A process for making a nanofibre membrane layer according to claim 1, comprising:
    (a) electrospinning of a polymer solution comprising a semicrystalline polyamide having a C/N ratio of at most 5.5 dissolved therein on a moving substrate, thereby forming a semi-continuous layer of deposited nanofibers; and
    (b) subjecting the deposited layer to an annealing step.

11. A multilayered membrane construction comprising a first layer consisting of a nanofiber membrane layer according to claim 1, and a second porous layer.

12. The multilayered membrane construction according to claim 11, wherein the second porous layer consists of a nonwoven web.

13. The multilayered membrane construction according to claim 11, wherein the second porous layer consists of a second nanofiber membrane layer.

14. A water or air filtration device comprising a nanofiber membrane according to claim 1.

15. The water or air filtration device according to claim 14, wherein the nanofiber membrane has a pleated configuration.

16. A water or air filtration device according to claim 14, which comprises a multilayered membrane structure comprised of the nanofiber membrane according to claim 1, and a second porous layer.

17. The water or air filtration device according to claim 16, wherein the nanofiber membrane has a pleated configuration.

* * * * *